United States Patent
Enyeart

(10) Patent No.: US 10,744,869 B2
(45) Date of Patent: Aug. 18, 2020

(54) INTEGRATED FUEL TANK ASSEMBLY

(71) Applicant: Daniel Ray Enyeart, Gladstone, OR (US)

(72) Inventor: Daniel Ray Enyeart, Gladstone, OR (US)

(*) Notice: Subject to any disclaimer, the term of this patent is extended or adjusted under 35 U.S.C. 154(b) by 651 days.

(21) Appl. No.: 15/357,024

(22) Filed: Nov. 21, 2016

(65) Prior Publication Data

US 2018/0141433 A1 May 24, 2018

(51) Int. Cl.
*B60K 15/03* (2006.01)

(52) U.S. Cl.
CPC .... *B60K 15/03* (2013.01); *B60K 2015/03217* (2013.01); *B60K 2015/03414* (2013.01); *B60K 2015/03453* (2013.01)

(58) Field of Classification Search
CPC .......... B60K 15/03; B60K 2015/03217; B60K 2015/03309

USPC ........................................................ 220/562
See application file for complete search history.

(56) References Cited

U.S. PATENT DOCUMENTS

| | | | |
|---|---|---|---|
| 2006/0151505 A1* | 7/2006 | Kobayashi | B29C 45/14262 220/562 |
| 2015/0361936 A1* | 12/2015 | Honda | F02M 37/0088 123/495 |
| 2016/0052385 A1* | 2/2016 | Luhn | B60K 15/03177 220/562 |
| 2017/0260943 A1* | 9/2017 | Hayashi | B60K 15/03 |

* cited by examiner

Primary Examiner — Anthony D Stashick
Assistant Examiner — Raven Collins
(74) Attorney, Agent, or Firm — Ingrid McTaggart

(57) ABSTRACT

The present invention relates to an integrated fuel tank assembly, and a process of manufacturing the same, for use in commercial vehicles, and more particularly, to an integrated fuel tank assembly that allows multiple components to be manufactured as a single integral structure, such as a single extruded device including a draw tube, a return tube, a fuel sender device, and a vent, for example.

5 Claims, 3 Drawing Sheets

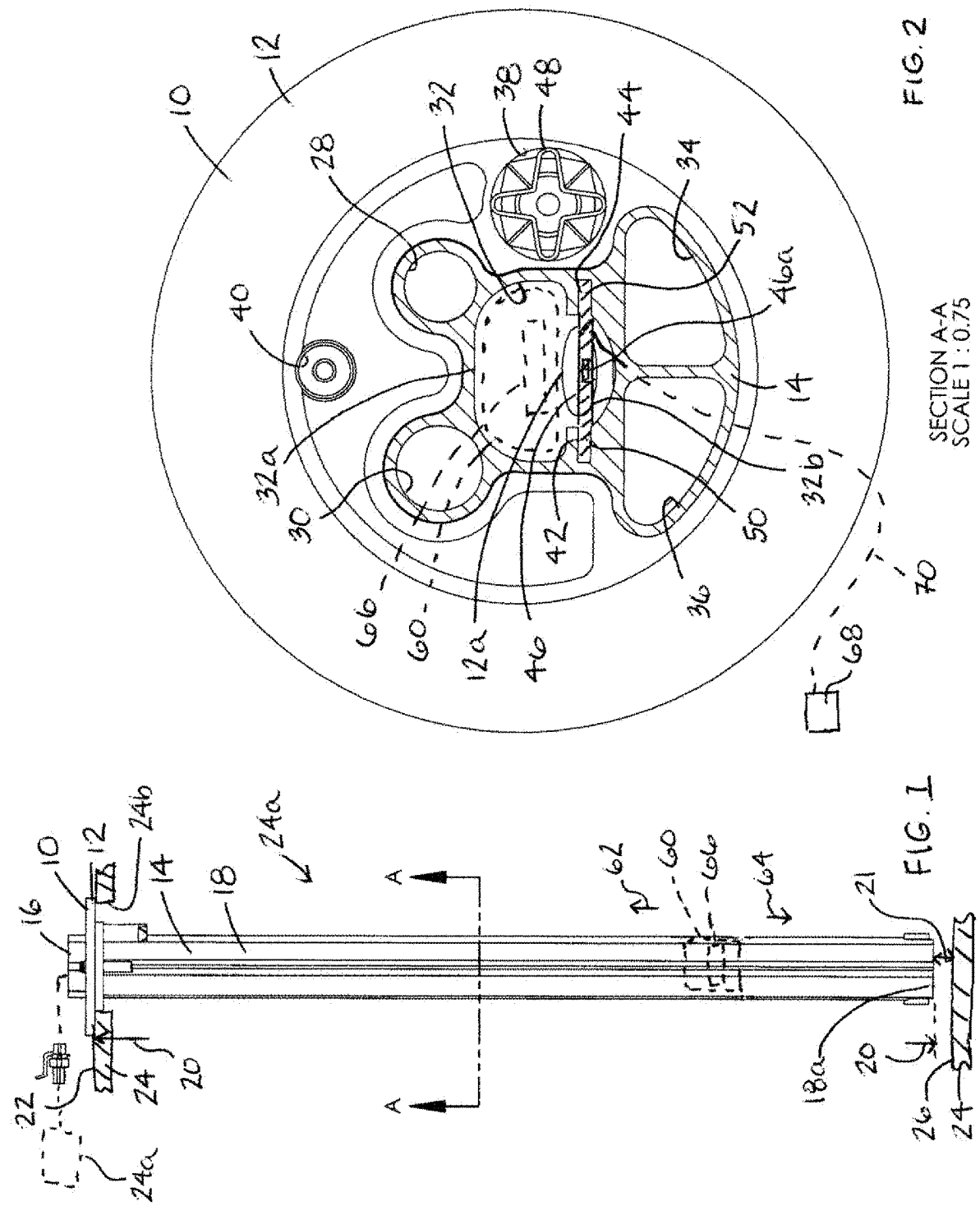

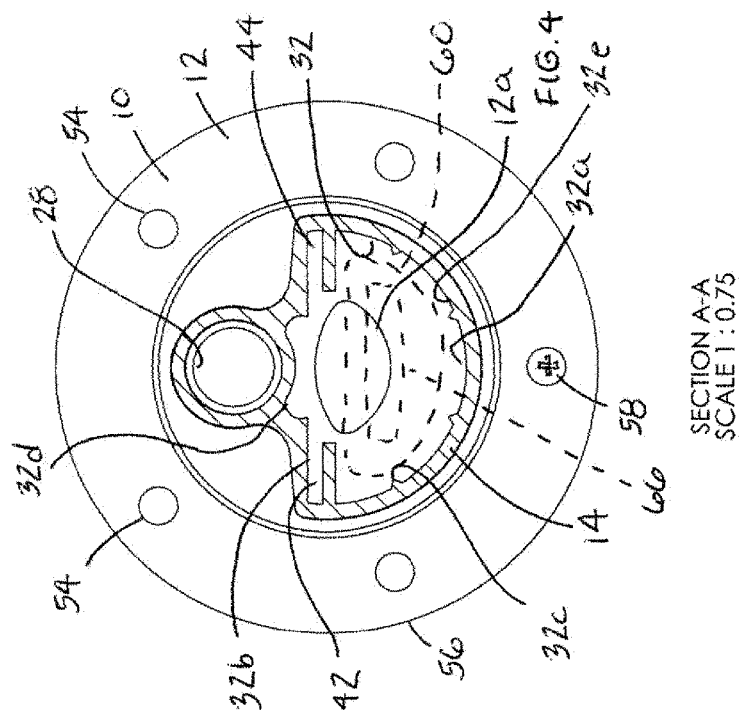
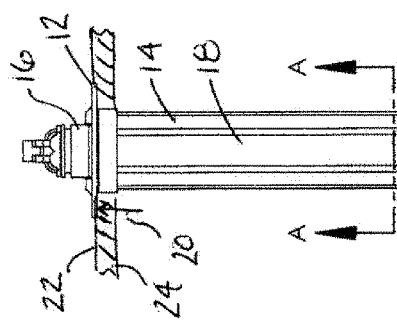
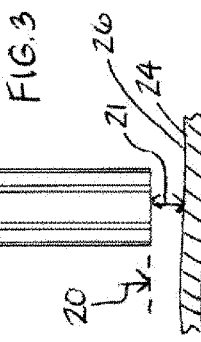

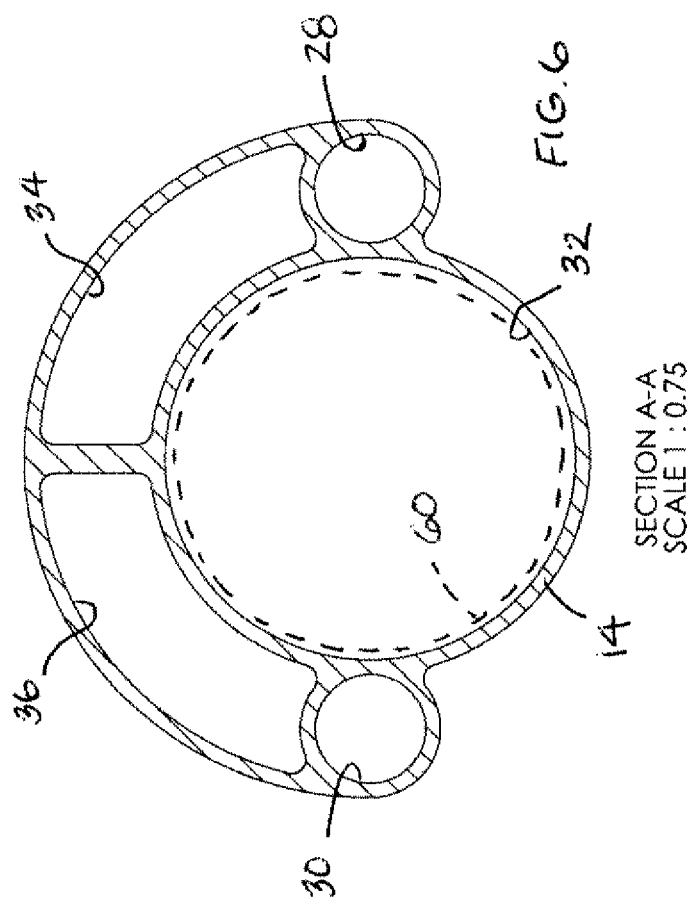
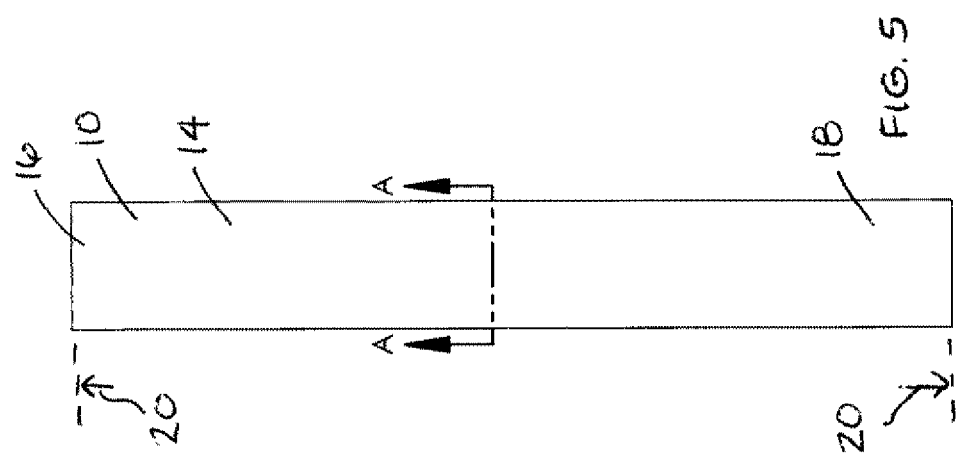

INTEGRATED FUEL TANK ASSEMBLY

TECHNICAL FIELD

The present invention relates to an integrated fuel tank assembly, and a process of manufacturing the same, for use in commercial vehicles, and more particularly, to an integrated fuel tank assembly that allows multiple components to be manufactured as a single integral structure, such as a single extruded device including a draw tube, a return tube, a fuel sender device, and a vent, for example.

BACKGROUND OF THE INVENTION

The present invention is particularly intended for use on commercial vehicles, which may include multiple components secured to or in a fuel tank. Prior art fuel tanks typically include multiple components secured to or in the fuel tank, such as draw and return tube assemblies, pressure valves, fuel sender devices, or other components each separately mounted to or on the fuel tank. Each of these components generally communicates with an interior of the fuel tank and is generally secured directly to the fuel tank. Accordingly, multiple components are secured to the fuel tank which may require an extensive amount of time to install, and an extensive amount of space on the fuel tank.

SUMMARY OF THE INVENTION

The present invention provides an integrated fuel tank assembly, and a process of manufacturing the same, that overcomes the disadvantages of the prior art. One aspect of the present invention provides a single integral, extruded device that includes a fuel draw line, an auxiliary fuel line, a fuel return line, a level sending unit cavity, a rollover vent, a coolant inlet, and a coolant outlet. Accordingly, separate devices need not be separately installed on a fuel tank, and need not each require a separate space on the fuel tank for installation. Moreover, the integrated assembly may be more cost effective to manufacture because all the components may be included in a single integral, extruded device, i.e., manufactured of a single piece of material. The integral assembly of the present invention may also be more sturdy and able to withstand the punishing environment of commercial trucking then prior art single, separately installed devices.

BRIEF DESCRIPTION OF THE DRAWINGS

FIG. 1 is a side view of one example embodiment of an integrated fuel tank assembly.

FIG. 2 is a top cross sectional view taken along line A-A of the integrated fuel tank assembly of FIG. 1.

FIG. 3 is a side view of another example embodiment of an integrated fuel tank assembly.

FIG. 4 is a top cross sectional view taken along line A-A of the integrated fuel tank assembly of FIG. 3.

FIG. 5 is a side view of yet another example embodiment of an integrated fuel tank assembly.

FIG. 6 is a top cross sectional view taken along line A-A of the integrated fuel tank assembly of FIG. 5.

DETAILED DESCRIPTION OF THE PREFERRED EMBODIMENTS

The invention discloses an integrated fuel tank assembly that allows multiple components to be manufactured as a single integral, extruded structure, and there after secured to or removed from a fuel tank with use of a single flange. A single integral structure means that the structure may be manufactured from a single piece of material such as extruding the structure, molding the structure, or otherwise forming the structure from a single piece of material, such as a single piece of metal, namely, aluminum, for example.

FIG. 1 is a side view of one example embodiment of an integrated fuel tank assembly 10. Assembly 10 includes a plate 12 having a single extruded structure or part 14 mounted thereon. In another embodiment, plate 12 may be manufactured integral with single part 14, such as by molding the plate 12 and the part 14 simultaneously. In one embodiment, single extruded part 14 includes a first portion 16 that extends above plate 12 and an elongate, second portion 18 that extends below plate 12. In the embodiment shown, part 14 extends from a lower surface of plate 12, through an aperture 24b in a side wall 22 of a fuel tank 24, through an interior 24a of a fuel tank, downwardly toward a lower region of a fuel tank 24 in which the part is installed. The length 20 of part 14 may be sized so that a majority of the individual components of the second portion 18 of assembly 10 will extend from an upper wall 22 of fuel tank 24, downwardly through the fuel tank 24, and to a lower wall 26 of the fuel tank 24. A lowermost edge 18a of portion 18 of part 14 may be positioned a distance 21 above lower wall 26 of fuel tank 24 as may be desired for a particular application.

FIG. 2 is a top cross sectional view taken along line A-A of the integrated fuel tank assembly of FIG. 1 showing assembly 10. Assembly 10 includes in single, integral part 14 a fuel return cavity or aperture 28, a fuel draw cavity or aperture 30, a level sender float cavity 32, a coolant out cavity or aperture 34, a coolant in cavity or aperture 36, a rollover vent cavity or aperture 38, and an auxiliary line cavity or aperture 40. The auxiliary line cavity 40 may be utilized to allow fuel to be moved from fuel tank 24 to an auxiliary device, such as a truck cabin heater, for example. Each of these apertures may extend the length of part 14 such that each aperture extends completely through part 14 and communicates with each end portion 16 and 18 of part 14. In the embodiment shown, level sender float cavity 32 defines a cross sectional shape having two opposed recesses 42 and 44 that are opposed to one another across the cross section of the part 14, and are sized and positioned to support and position therein a level sender detection device 46, such as a reed switch circuit board 46 (shown schematically) that extends downwardly within cavity 32 along at least a portion of length 20 of part 14. A rollover vent 48 may be positioned within rollover vent aperture 38.

In the embodiment shown, two opposed recessed 42 and 44 are each generally rectangular in shape so as to receive and secure therein the opposed generally rectangular edges 50 and 52 of a relatively flat, elongate reed switch board 46. In the embodiment shown, rollover vent aperture 38 and fuel draw and return apertures 28 and 30 are each circular in cross sectional shape. Coolant in and out apertures 34 and 36 are generally triangular in cross sectional shape and level sender float cavity 32 is generally rectangular in shape. In other embodiments, other shapes and arrangements of the apertures may be utilized for a particular purpose.

In this embodiment, part 14 combines the fuel draw and return lines, the level sending unit, the auxiliary aperture, and the coolant inlet and outlet cavities in one extruded shape. The level sender cavity 32 will retain a circuit board adjacent to a magnet-equipped float 60 (shown in dash lines), wherein the float 60 may ride along an interior of part 14, within cavity 32, in either of directions 62 and 64 (FIG. 1). In particular, float 60 moves upwardly in direction 62 as fuel is filled into fuel tank 24 and the float 60 moves downwardly in direction 64 as fuel is utilized by the engine, and removed from tank 24 during use. As float 60 moves along the interior of part 14 in cavity 32, in either of directions 62 or 64, the float moves a magnet 66 embedded within float 60 (shown in dash lines) along a circuit board 46 positioned in cavity 32 such that the magnet 66 engages switches 46a (shown schematically) on circuit board 46, thereby providing information regarding the fuel level in the fuel tank 24. Plate 12 may include an aperture 12a that may allow wires 70 (shown in dash lines) to extend into cavity 32 from exterior of the fuel tank 24, so that level sender unit circuit board 46 may be electronically connected to a control unit 68 (shown schematically) outside of assembly 10. In this manner the lever sending unit 46 and control unit 68 may be utilized to show a truck operator, for example, the level of fuel within fuel tank 24.

Still referring to FIG. 2, in this embodiment, cavity 32 includes a first region 32a that is generally "D" shaped for receiving a "D" shaped float 60, and a second region 32b that is generally rectangular in shape for receiving rectangular shaped level sender unit circuit board 46. The "D" shape of first region 32a of cavity 32, which may be manufactured in a shape that corresponds to an exterior shape of float 60, inhibits rotation of a float 60 within the cavity, so that a magnet 66 embedded within the float 60 will remain positioned against the reed switch circuit board 46 secured within cavity 32. In this manner, the magnet 66 will remain in close proximity to the reed switch circuit board 46 as the float 60 moves upwardly and downwardly within cavity 32, in response to a change in fuel level within the fuel tank 24 in which assembly 10 is installed. In other embodiments the cavity 32 and float 60 may have different cross sections shapes as desired for a particular application. For example, any non-circular cross-sectional shape will allow the cavity 32 to inhibit rotation of a float 60 within the cavity 32 and thereby retain a magnet 66 in position against a reed switch circuit board 46 secured within the cavity 32. For purposes of this application, the fuel draw line aperture 30 of this embodiment may route fuel from a fuel tank 24 to an engine 24a (shown schematically). The fuel return line aperture 28 may route excess fuel back to the fuel tank 24 from an engine 24a.

FIG. 3 is a side view of another example embodiment of an integrated fuel tank assembly 10. Assembly 10 includes a plate 12 having a single extruded structure or part 14 mounted thereon. In another embodiment, plate 12 may be manufactured integral with single part 14. In one embodiment, single extruded part 14 includes a first portion 16 that extends above plate 12 and an elongate, second portion 18 that extends below plate 12. In the embodiment shown, part 14 extends from a lower surface of plate 12 downwardly toward a lower region of a fuel tank 24 in which the part is installed. The length 20 of part 14 may be sized so that a majority of the individual components of the second portion 18 of assembly 10 will extend from an upper wall 22 of a fuel tank 24, downwardly through the fuel tank 24, and to a lower wall 26 of the fuel tank 24.

FIG. 4 is a top cross sectional view taken along line A-A of the integrated fuel tank assembly 10 of FIG. 3. In this embodiment part 14 includes a return fuel cavity 28 and a level sender float cavity 32. Plate 12 may include a plurality of apertures 54 sized and spaced around a circumference 56 of plate 12 to receive therein fasteners 58, such as a threaded screw or bolt, so as to secure plate 12, and thereby secure assembly 10, to upper wall 22 of fuel tank 24 (FIG. 3). In the embodiment shown, level sender float cavity second region 32b defines a cross sectional shape having two opposed recesses 42 and 44 that are opposed to one another across the cross section of the part 14, and are sized and positioned to support and position therein a reed switch circuit board 46 (FIG. 2) that extends downwardly within cavity 32 along at least a portion of length 20 of part 14. In the embodiment shown, two opposed recesses 42 and 44 are each generally rectangular in shape so as to receive and secure therein the opposed generally rectangular edges 50 and 52 (FIG. 2) of a relatively flat, elongate reed switch board 46. First region 32a of level sender cavity 32 may be generally "D" shaped and may include inwardly protruding portions 32c that may retain float 60 centrally within cavity 32, and away from the side walls 32e of cavity 32, and may thereby allow fuel to flow around float 60 within cavity 32, so as to allow float 60 to accurately measure the level of fuel within fuel tank 24. In this embodiment, cavity 32 may include a recessed region 32d adjacent to second region 32b, wherein a wall shape of recessed region 32d maintains a wall thickness of material surrounding fuel return cavity 28. In other embodiments, other shapes and arrangements of the apertures, other wall shapes and other sizes may be utilized for a particular purpose.

In this embodiment, part 14 combines a fuel return line 28 and a level sending unit cavity 32 in one extruded shape. The level sending cavity 32 will retain a circuit board 46 (FIG. 2) adjacent to a magnet-equipped float 60 (FIG. 1). This embodiment my work in conjunction with another unit that may house the fuel draw line mounted elsewhere on the fuel tank 24.

FIG. 5 is a side view of yet another example embodiment of an integrated fuel tank assembly 10. In this embodiment, assembly 10 does not include a plate 12 secured to single, integral part 14.

FIG. 6 is a top cross sectional view taken along line A-A of the integrated fuel tank assembly 10 of FIG. 5. In this embodiment, part 14 includes a fuel return cavity 28, a fuel draw cavity 30, a coolant out cavity 34, a coolant in cavity 36, and an ultrasonic level sender focus tube cavity 32. In this embodiment the ultrasonic level sender focus tube cavity 32 is circular in shape and does not include opposed recesses 42 and 44 of the previous embodiments (FIGS. 2 and 4) because the ultrasonic level sender focus tube apparatus 60 that may be received within cavity 32 may have a circular exterior cross sectional shape (shown in dash lines) and may not include a level sender reed switch circuit board 46 (FIG. 2).

In this embodiment, part 14 combines the fuel draw and fuel return lines 28 and 30, a focus tube cavity 32 for positioning and securing therein a level sender detection device 46, such as an ultrasonic level sending unit 46, and coolant inlet and outlet cavities 34 and 36, in one integral piece of material, such as in an extruded part 14.

The assembly 10 of the present invention may include plate 12 manufactured of metal or plastic, for example, wherein the plate 12 may be manufactured integral with part 14 or secured to part 14 after manufacturing of part 14. Plate 12 may also be referred to as a lock ring which may be secured to a fuel tank 24 by welding or any other securement means as may be desirable. The fuel draw and return cavities 28 and 30 may be injection molded or extruded components of part 14 and may impart rigidity to part 14. Part 14 may be manufactured of aluminum or any other material as is suitable for a particular purpose.

As may be understood from the above description and drawings, the present invention has many advantages over prior art fuel tank assemblies. In the above description numerous details have been set forth in order to provide a more through understanding of the present invention. It will be obvious, however, to one skilled in the art that the present invention may be practiced using other equivalent designs.

I claim:

1. A fuel tank assembly, comprising:
   a fuel tank including a top wall and a bottom wall that define an interior of said fuel tank there between, said top wall including an aperture that extends there through;
   a cavity structure that defines a top region secured within said aperture of said fuel tank, a bottom region positioned adjacent said bottom wall of said fuel tank/ and a length that extends from said top region to said bottom region of said cavity structure, said cavity structure comprising a single/ integral piece of material and including a first cavity, a second cavity, a third cavity, a fourth cavity, and a fifth cavity, each of said first, second, third, fourth and fifth cavities defined by a sidewall that extends completely and continuously along said length of said cavity structure such that each of said first cavity, said second cavity, said third cavity, said fourth cavity, and said fifth cavity defines an isolated fluid pathway extending from said top region of said cavity structure to said bottom region of said cavity structure wherein fluid entering each of said first cavity, said second cavity, said third cavity, said fourth cavity, and said fifth cavity is fluidly isolated from fluid traveling in a remainder of said first, second, third, fourth and fifth cavities completely along said length;
   a level sensing device positioned within said first cavity, said level sensing device sensing a level of fluid within said fuel tank;
   wherein said cavity structure defines a cross sectional shape that is unchanging along said length of said cavity structure; and
   wherein said level sensing float cavity includes a float and wherein said first cavity includes an interior cross sectional shape that corresponds to an exterior cross sectional shape of said float of said level sender float cavity.

2. A fuel tank assembly, comprising:
   a fuel tank including a wall that defines a top surface and a bottom surface of said fuel tank, said top surface including an aperture that extends there through;
   a fluid flow structure that defines a top region secured within said aperture of said fuel tank, a bottom region positioned adjacent said bottom surface of said fuel tank, and a length that extends from said top region to said bottom region of said fluid flow structure, said fluid flow structure comprising a single, integral piece of material and including five isolated, continuous fluid pathways extending completely along said length of said fluid flow structure wherein each of said five continuous fluid pathways are fluidly isolated from a remainder of said five fluid pathways completely along said length of said fluid flow structure; and
   a level sensing device positioned within said first fluid pathway, said level sensing device sensing a level of fluid within said fuel tank.

3. The assembly of claim 2 wherein each of said five isolated fluid pathways is defined by a corresponding sidewall of said fluid flow structure that extends continuously in a fluid tight manner along said length of said fluid flow structure.

4. The assembly of claim 2 wherein said fluid flow structure defines an outermost perimeter measured perpendicular to said length, wherein said outermost perimeter is unchanging along said length of said fluid flow structure, and wherein said outermost perimeter of said fluid flow structure extends through said aperture of said fuel tank.

5. The assembly of claim 2 wherein said fluid flow structure contacts said fuel tank only at said top surface adjacent to said aperture.

* * * * *